United States Patent
Shirakawa

(10) Patent No.: US 8,410,034 B2
(45) Date of Patent: Apr. 2, 2013

(54) ETHER COMPOSITION

(75) Inventor: Daisuke Shirakawa, Tokyo (JP)

(73) Assignee: Asahi Glass Company, Limited, Tokyo (JP)

( * ) Notice: Subject to any disclaimer, the term of this patent is extended or adjusted under 35 U.S.C. 154(b) by 350 days.

(21) Appl. No.: 12/793,212

(22) Filed: Jun. 3, 2010

(65) Prior Publication Data

US 2010/0240559 A1 Sep. 23, 2010

(30) Foreign Application Priority Data

Jan. 24, 2008 (JP) .................................. 2008-013638
Jul. 30, 2008 (JP) .................................. 2008-196371

(51) Int. Cl.
*C10M 169/04* (2006.01)
(52) U.S. Cl. ..... 508/582; 526/247; 528/401; 428/835.8; 568/677
(58) Field of Classification Search ................. 508/582; 526/247; 528/401; 568/677; 428/835.8
See application file for complete search history.

(56) References Cited

U.S. PATENT DOCUMENTS

| | | | |
|---|---|---|---|
| 6,348,266 B1 * | 2/2002 | Liu et al. ........................ | 428/421 |
| 6,660,886 B1 * | 12/2003 | Liu et al. ........................ | 564/159 |
| 7,230,140 B2 | 6/2007 | Shirakawa et al. | |
| 7,388,114 B2 | 6/2008 | Shirakawa et al. | |
| 2002/0090515 A1 | 7/2002 | Pellerite et al. | |
| 2005/0197408 A1 | 9/2005 | Shirakawa et al. | |
| 2006/0252910 A1 | 11/2006 | Shirakawa et al. | |
| 2007/0116990 A1 | 5/2007 | Shirakawa et al. | |
| 2008/0132664 A1 * | 6/2008 | Shirakawa et al. ........... | 526/247 |

FOREIGN PATENT DOCUMENTS

| | | |
|---|---|---|
| EP | 2236559 A1 * | 10/2010 |
| JP | 2004-519715 | 7/2004 |
| JP | 2006-45159 | 2/2006 |
| JP | 2006-045159 * | 2/2006 |
| JP | 2008-034064 | 2/2008 |
| WO | 2004/035656 | 4/2004 |
| WO | 2005/068534 | 7/2005 |
| WO | 2006/011387 | 2/2006 |
| WO | 2007/013412 | 2/2007 |
| WO | WO-2007/013412 A1 * | 2/2007 |
| WO | WO-2009/093665 A1 * | 7/2009 |

OTHER PUBLICATIONS

U.S. Appl. No. 13/440,117, filed Apr. 5, 2012, Shirakawa, et al.
U.S. Appl. No. 12/793,757, filed Jun. 4, 2010, Shirakawa, et al.
U.S. Appl. No. 13/038,472, filed Mar. 2, 2011, Shirakawa, et al.
Monthyl "Tribology", 1995, vol. 99, November issue, p. 37-38.

\* cited by examiner

*Primary Examiner* — Peter D. Mulcahy
*Assistant Examiner* — Henry Hu
(74) *Attorney, Agent, or Firm* — Oblon, Spivak, McClelland, Maier & Neustadt, L.L.P.

(57) ABSTRACT

Provided is an ether composition containing at least two ether compounds each of which has from 1 to 4 groups represented by formula (X) and from 0 to 3 groups represented by formula (Z), where the total number of groups represented by formula (X) and (Z) is 4:

$$HO-(CH_2CH_2O)_a \cdot (CH_2CH(OH)CH_2O)_b-Q- \quad (X),$$

$$CF_3(CF_2)_sO(CF_2CF_2O)_g- \quad (Z),$$

where a, b, s, g and Q are defined herein. The ratio ($CF_3/(OH+CF_3)$) of the total molar amount of $CF_3$ groups in the groups represented by formula (Z) to the sum of the total molar amount of $CF_3$ groups in the groups represented by formula (Z) and the total molar amount of OH groups in the groups represented by formula (X) is from 0.01 to 0.5.

14 Claims, No Drawings

ETHER COMPOSITION

TECHNICAL FIELD

The present invention relates to an ether composition useful as a lubricant, etc.

BACKGROUND ART

A perfluorinated polyether compound (hereinafter referred to as PFPE) is used as a lubricant, etc. to be applied to the surface of a magnetic recording medium (Non-Patent Document 1).

As such a lubricant, PFPE having two $CH_2OH$ groups at its molecular terminals has been commonly used.

Further, the present applicant has proposed the following as PFPE or its composition, which is useful as a lubricant, etc.

(1) PFPE having three $CH_2OH$ groups, or PFPE having two $CH_2OH$ groups and one $CF_3$ group (Patent Document 1).

(2) An ether composition comprising two types of PFPEs different in the molecular weight (Patent Document 2).

In recent years, along with an increase in the recording density of a magnetic recording medium, narrowing of a space between a recording element and a magnetic recording medium and a trend for high speed of rotation of a magnetic recording medium have been advanced. Accordingly, the application environment of a lubricant to be applied on the surface of a magnetic recording medium has been increasingly severe. Therefore, the lubricant is required to have the following properties.

(i) It has a high fixative to a magnetic recording medium, along with the trend for high speed of the magnetic recording medium.

(ii) It forms a coating having a low friction coefficient surface so that when a recording head contacts magnetic recording media, the impact by the contact is dissipated.

However, PFPE heretofore proposed did not provide sufficient performance to meet such requirements.

Non-Patent Document 1: "Monthly TRIBOLOGY", 1995, vol. 99, November issue, p. 37-38
Patent Document 1: WO2005/068534
Patent Document 2: WO2007/013412

DISCLOSURE OF THE INVENTION

Object to be Accomplished by the Invention

The present invention is to provide an ether composition which has a high fixative to a substrate and which has a low surface friction coefficient when formed into a coating film, and a lubricant containing such an ether composition.

Means to Accomplish the Object

The present invention provides the following.

(1) An ether composition comprising at least two ether compounds (A) each of which has from 1 to 4 groups represented by the following formula (X) and from 0 to 3 groups represented by the following formula (Z), with the total of the groups represented by the formula (X) and the groups represented by the formula (Z) being 4:

$$HO-(CH_2CH_2O)_a-(CH_2CH(OH)CH_2O)_b-Q- \quad (X),$$

$$CF_3(CF_2)_sO(CF_2CF_2O)_g- \quad (Z),$$

provided that in the above formulae (X) and (Z), a is an integer of from 0 to 100, b is 0 or 1, s is an integer of from 0 to 19, g is an integer of from 3 to 200, and Q is a polyfluorinated polymethylene group or a polyfluorinated polymethylene group having an etheric oxygen atom.

(2) The ether composition according to the above (1), wherein said at least two ether compounds (A) are at least two members selected from the group consisting of a compound represented by the following formula (A1), a compound represented by the following formula (A2), a compound represented by the following formula (A3) and a compound represented by the following formula (A4):

$$(X-)_4Y \quad (A1),$$

$$(X-)_3Y-Z \quad (A2),$$

$$(X-)_2Y(-Z)_2 \quad (A3),$$

$$X-Y(-Z)_3 \quad (A4).$$

Wherein X is a group represented by the above formula (X),

Y is a perfluoroalkane-tetrayl group or a group having an etheric oxygen atom inserted between carbon-carbon atoms of such a perfluoroalkane-tetrayl group and not having a structure of the group represented by the formula (Z), and Z is a group represented by the above formula (Z).

(3) The ether composition according to the above (1) or (2), wherein X is a group selected from the group consisting of a group represented by the following formula (X1), a group represented by the following formula (X2), a group represented by the following formula (X3) and a group represented by the following formula (X4):

$$HOCH_2CF_2O(CF_2CF_2O)_d- \quad (X1),$$

$$HOCH_2CH(OH)CH_2OCH_2CF_2O(CF_2CF_2O)_d- \quad (X2),$$

$$HOCH_2CH_2CF_2O(CF_2CF_2O)_d- \quad (X3),$$

$$HOCH_2CH_2OCH_2CF_2O(CF_2CF_2O)_d \quad (X4),$$

wherein d is an integer of from 1 to 200.

(4) The ether composition according to the above (2) or (3), wherein Y is a group having no $CF_3$ group.

(5) The ether composition according to the above (2) or (3), wherein Y is a group selected from the group consisting of a group represented by the following formula (Y-1), a group represented by the following formula (Y-2), a group represented by the following formula (Y-3) and a group represented by the following formula (Y-4):

-continued

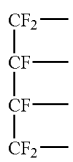

(Y-3)

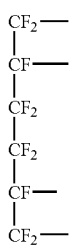

(Y-4)

(6) The ether composition according to any one of the above (2) to (5), wherein the compound represented by the formula (A1) is a compound represented by the following formula (A1-1); the compound represented by the formula (A2) is a compound represented by the following formula (A2-1a), a compound represented by the following formula (A2-1b) or a combination of a compound represented by the following formula (A2-1a) and a compound represented by the following formula (A2-1b); the compound represented by the formula (A3) is a compound selected from the group consisting of a compound represented by the following formula (A3-1a), a compound represented by the following formula (A3-1b), a compound represented by the following formula (A3-1c) and a compound represented by the following formula (A3-1d); and the compound represented by the formula (A4) is a compound represented by the following formula (A4-1a), a compound represented by the following formula (A4-1b) or a combination of a compound represented by the following formula (A4-1a) and a compound represented by the following formula (A4-1b):

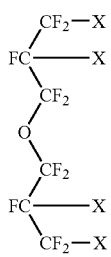

(A1-1)

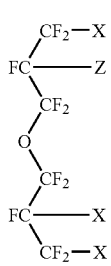

(A2-1a)

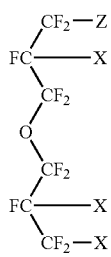

(A2-1b)

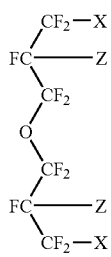

(A3-1a)

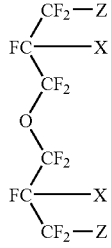

(A3-1b)

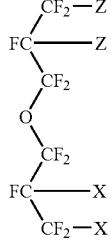

(A3-1c)

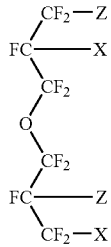

(A3-1d)

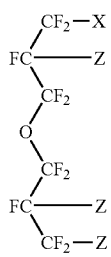

(A4-1a)

-continued

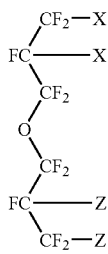
(A4-1b)

wherein X and Z in the formulae are as defined above.

(7) The ether composition according to any one of the above (1) to (6), wherein the ratio ($CF_3/(OH+CF_3)$) of the total molar amount of $CF_3$ groups in the groups represented by the formula (Z) to the sum of the total molar amount of $CF_3$ groups in the groups represented by the formula (Z) and the total molar amount of OH groups in the groups represented by the formula (X) is from 0.01 to 0.5.

(8) The ether composition according to any one of the above (1) to (7), wherein the ether compounds (A) have no —$OCF_2O$— structure.

(9) The ether composition according to any one of the above (1) to (8), wherein the total amount of the ether compounds (A) is at least 95 mass % based on the ether composition.

(10) The ether composition according to any one of the above (1) to (9), which has a number average molecular weight of from 500 to 1,000,000 and a molecular weight distribution of from 1.01 to 1.5.

(11) A lubricant containing the ether composition as defined in any one of the above (1) to (10).

Effects of the Invention

The ether composition of the present invention has a high fixative to a substrate and has a low surface friction coefficient when formed into a coating film.

BEST MODE FOR CARRYING OUT THE INVENTION

In this specification, a compound represented by the formula (A1) will be referred to as a compound (A1). Compounds represented by other formulae will be referred to in the same manner.

Further, a group represented by the formula (X) will be referred to as a group (X). Groups represented by other formulae will be referred to in the same manner.

The ether composition of the present invention comprises at least two ether compounds (A) each of which has from 1 to 4 groups (X) and from 0 to 3 groups (Z), with the total of the groups (X) and the groups (Z) being 4:

HO—$(CH_2CH_2O)_a$.$(CH_2CH(OH)CH_2O)_b$-Q-     (X),

$CF_3(CF_2)_sO(CF_2CF_2O)_g$—     (Z).

With respect to the group (X):
a is an integer of from 0 to 100, preferably an integer of from 0 to 10, more preferably an integer of from 0 to 2, particularly preferably 0 or 1. In a case where b is 1, a is preferably 0.

b is 0 or 1.

The representation of the —$(CH_2CH_2O)_a$.$(CH_2CH(OH)CH_2O)_b$— structure means that in a case where at least one unit of each of the ($CH_2CH_2O$) unit and the ($CH_2CH(OH)CH_2O$) unit is present, sequential arrangement of such units is not limited. That is, when both units are present, the terminal OH group may be bonded to either unit. Further, the —$(CH_2CH_2O)_a$.$(CH_2CH(OH)CH_2O)_b$— structure may be a block copolymer structure or a random copolymer structure.

Q is a polyfluorinated polymethylene group, or a polyfluorinated polymethylene group having an etheric oxygen atom. The polyfluorinated polymethylene group means a group having at least two hydrogen atoms in —$(CH_2)_t$— (wherein t is an integer of at least 2) substituted by fluorine atoms. Q is preferably a group represented by —$(CH_2)_c$—$CF_2O(CF_2CF_2O)_d$—, provided that the right hand side terminal of the group is bonded to Y; c is an integer of from 1 to 100; and d is an integer of from 1 to 200.

The group (X) is preferably a group (X').

HO—$(CH_2CH_2O)_a$.$(CH_2CH(OH)CH_2O)_b$—$(CH_2)_c$—$CF_2O(CF_2CF_2O)_d$—     (X').

Wherein a to d are as defined above,
c is preferably an integer of from 1 to 10, more preferably 1 or 2, and
d is preferably an integer of from 3 to 100, more preferably an integer of from 5 to 50.

In a case where a plurality of groups (X) are present in one molecule, they may be the same groups or different groups. In the category of groups (X) being the same groups, groups different in the number of structural units are included. For example, groups (X') wherein the number of d is the same, or groups (X') wherein only the number of d is different, are considered to be the same groups. With respect to the numbers of a, b, c and d, groups (X') wherein a, b and c as the numbers other than d, are different from one another, are considered to be different groups. In a case where a plurality of groups (X) are present in one molecule, they are preferably the same groups.

The group (X) is preferably a group (X1), a group (X2), a group (X3) or a group (X4), more preferably a group (X1) or a group (X2) from the viewpoint of the stability and efficiency for the production of the ether compound (A).

$HOCH_2CF_2O(CF_2CF_2O)_d$—     (X1),

$HOCH_2CH(OH)CH_2OCH_2CF_2O(CF_2CF_2O)_d$—     (X2),

$HOCH_2CH_2CF_2O(CF_2CF_2O)_d$—     (X3),

$HOCH_2CH_2OCH_2CF_2O(CF_2CF_2O)_d$—     (X4).

With respect to the group (Z):
s is an integer of from 0 to 19, preferably an integer of from 0 to 15, more preferably an integer of from 0 to 5, and
g is an integer of from 3 to 200, preferably an integer of from 3 to 100, more preferably an integer of from 3 to 70, particularly preferably an integer of from 5 to 50.

The groups (Z) being the same groups means the groups wherein the number of is the same, and the number of g may be the same or different. The groups (Z) are preferably the same groups.

The group (Z) is a group which contributes to lowering of the friction coefficient, and it preferably has a chain length to some extent so that the molecular freedom of a $CF_3$ group will increase and is more preferably a group (Z1), a group (Z2) or a group (Z3).

$CF_3O(CF_2CF_2O)_9$—     (Z1),

$CF_3(CF_2)_2O(CF_2CF_2O)_g$—     (Z2),

$CF_3(CF_2)_5O(CF_2CF_2O)_g$—     (Z3).

The ether composition of the present invention is preferably an ether composition comprising at least two compounds selected from the group consisting of a compound (A1), a compound (A2), a compound (A3) and a compound (A4), more preferably an ether composition comprising a compound (A1) and a compound (A2). Each of the compounds (A1) to (A4) in the ether composition may be composed of one or more types of compounds, and each of the compounds (A1) to (A4) is preferably composed of one type of compound.

(X—)$_4$Y  (A1), (X—)$_3$Y—Z  (A2), (X—)$_2$Y(—Z)$_2$  (A3),

X—Y(—Z)$_3$  (A4), wherein X is a group (X), and Z is a group (Z).

Y is a perfluoroalkane-tetrayl group or a group having an etheric oxygen atom inserted between carbon-carbon atoms of such a perfluoroalkane-tetrayl group and not having a structure of the group represented by the formula (Z).

The perfluoroalkane-tetrayl group means a tetravalent saturated hydrocarbon group having all hydrogen atoms substituted by fluorine atoms. Further, a quaternary carbon atom having a CF$_3$ group bonded thereto means a carbon atom having no fluorine atom bonded thereto.

For the following reason, Y is a group having no CF$_3$ group, or if it has a CF$_3$ group, it is preferred that such a CF$_3$ group is bonded to a quaternary carbon, but it is preferably a group having no CF$_3$ group.

That is, the present inventors have studied the relation between the mutually opposing characteristics of a low friction coefficient and a high fixability, and the structure of PFPE, and as a result, have found that a CF$_3$ group bonded to a secondary carbon atom (CF$_2$) or a tertiary carbon atom (CF) has a high degree of freedom in the molecule and thus is a group which contributes to a decrease of the friction coefficient (viscosity lowering), while it is a group which hinders the fixability. Therefore, the present inventors have decided to control the proportion of CF$_3$ groups in the ether composition in order to satisfy both a low friction coefficient and a high fixability and to let a CF$_3$ group be present only at a terminal of Z in order to facilitate such control, or even if such a group is present in Y, it is permitted to be present as a CF$_3$ group bonded to a quaternary carbon atom having a relatively low degree of freedom. Further, from the viewpoint of efficient availability of the compound, it is particularly preferred that Y is a group having no CF$_3$ group.

Y may be a group having an etheric oxygen atom inserted between carbon-carbon atoms. In a case where etheric oxygen atoms are present, the number of etheric oxygen atoms is preferably from 1 to 3. Since an etheric oxygen atom is present between carbon-carbon atoms, no etheric oxygen atom is present at the terminal of Y bonded to X or Z. In a case where Y contains an etheric oxygen atom, it is preferred that no —OCF$_2$O— structure is present in Y, and it is preferred that no —OCF$_2$— structure is present at the terminal portion bonded to X and Z. In the case of a compound wherein no such a structure is present, the chemical stability is remarkably improved.

Y is more preferably any one of a group (Y-1) to a group (Y-4). The group (Y-1) is particularly preferred from the viewpoint of efficiency in the synthesis, the chemical stability of the compound and the low crystallinity.

(Y-1)

(Y-2)

(Y-3)

(Y-4)

In a case where each of the compounds (A1) to (A4) comprises at least two compounds, they may be compounds wherein Y is the same, and a, b, c or d in the group (X) is different. The average of a in the group (X) is preferably a positive number of from 0 to 2, particularly preferably 0. In the group (X'), the average of c is preferably 1. The average of d is preferably a positive number of from 3 to 100. In the group (Z), the average of g is preferably a positive number of from 3 to 100.

The ether compound (A) preferably has no —OCF$_2$O— structure from the viewpoint of the chemical stability. The compound having no —OCF$_2$O— structure means a compound, in which the presence of such a structure cannot be detected by a usual analytical method (such as $^{19}$F-NMR).

As the compound (A1), a compound (A11) or a compound (A12) is preferred.

(A11),

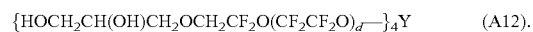

(A12).

As the compound (A2), a compound (A21) or a compound (A22) is preferred.

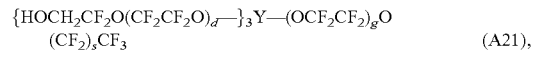

(A21),

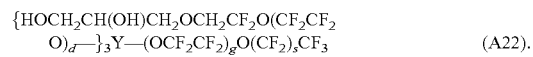

(A22).

As the compound (A3), a compound (A31) or a compound (A32) is preferred.

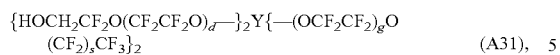 (A31),

 (A32).

As the compound (A4), a compound (A41) or a compound (A42) is preferred.

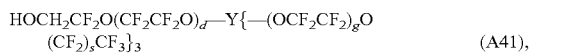 (A41),

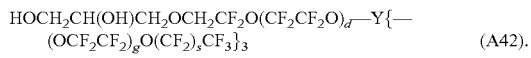 (A42).

In a case where Y is the group (Y-1), the compound (A1) is preferably a compound (A1-1), the compound (A2) is preferably a compound selected from the group consisting of a compound (A2-1a), a compound (A2-1b), and a combination of a compound (A2-1a) and a compound (A2-1b), the compound (A3) is preferably a compound selected from the group consisting of a compound (A3-1a) to a compound (A3-1d), and the compound (A4) is preferably a compound selected from the group consisting of a compound (A4-1a), a compound (A4-1b), and a combination of a compound (A4-1a) and a compound (A4-1b).

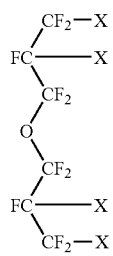 (A1-1)

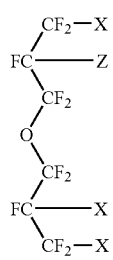 (A2-1a)

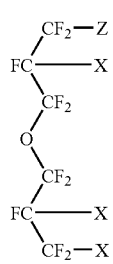 (A2-1b)

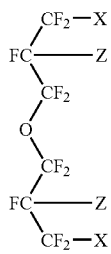 (A3-1a)

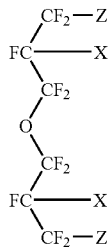 (A3-1b)

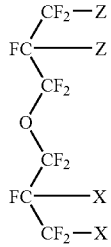 (A3-1c)

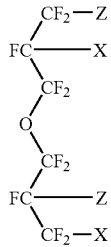 (A3-1d)

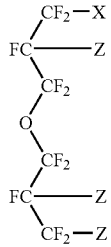 (A4-1a)

(A4-1b)

provided that X and Z in the formulae are as defined above.

In a case where the ether composition of the present invention comprises at least two types of each of the compounds (A1) to (A4), for example, in a case where it comprises at least two types of the compound (A1), preferred is a combination of a compound (A11) wherein X is a group (X1), and a compound (A12) wherein X is a group (X2). Further preferred is a combination of a compound (A11-1) wherein Y is a group (Y-1) and X is a group (X1), and a compound (A12-1) wherein Y is a group (Y-1) and X is a group (X2).

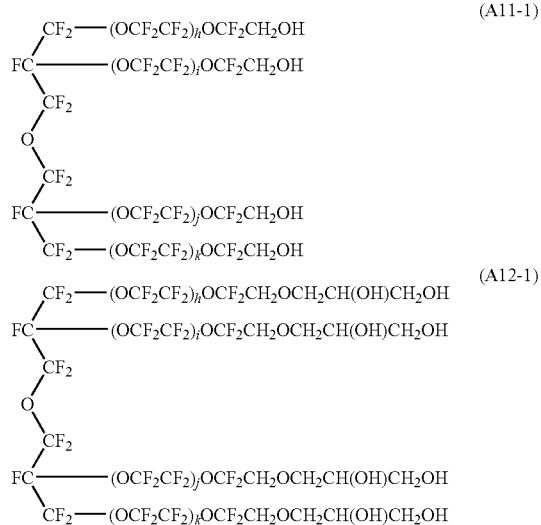

provided that h, i, j and k in the formulae are the same as the above d.

The ether composition comprising the compound (A11) and the compound (A12) may further contain a compound (A13a), a compound (A13b), or a combination of the compound (A13a) and the compound (A13b). In the compound (A13a) and the compound (A13b), Y is preferably a group (Y-1).

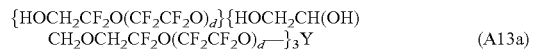

(A13a)

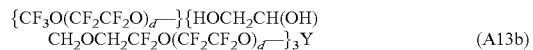

(A13b)

The ether composition of the present invention preferably contains an ether compound having the group (Z) as an essential component. Further, the present inventors have found that the friction coefficient and the fixative will be changed by the proportion of the group (Z) and have specified a preferred range of the ratio of the group (Z). That is, in the ether composition of the present invention, the ratio ($CF_3/(OH+CF_3)$), hereinafter referred to as the $CF_3$ ratio) of the total molar amount of $CF_3$ groups in the groups (Z) to the sum of the total molar amount of $CF_3$ groups in the groups (Z) and the total molar amount of OH groups in the groups (X) is preferably from 0.01 to 0.5, more preferably from 0.01 to 0.25, particularly preferably from 0.01 to 0.15, especially preferably from 0.01 to 0.05. By adjusting the $CF_3$ ratio to be within such a specific range, the ether composition of the present invention can satisfy the low friction coefficient and the high fixative at high levels. If the $CF_3$ ratio in the composition is made to be too large, a drawback of bleeding out tends to increase rather than the effect of lowering the friction coefficient. On the other hand, if the $CF_3$ ratio is made to be too low, the friction coefficient tends to be large. Whereas, the composition of the present invention comprising at least two types of compounds including a compound having a $CF_3$ terminal, exhibits an effect of lowering the adhesion to another object to be contacted. In the composition of the present invention, the presence of a small amount of the terminal group $CF_3$ of Z remarkably contributes to an increase of the fixative of the composition, lowering of the frictional coefficient and prevention of bleeding out.

The method of determining the $CF_3$ ratio may be a method of identifying the structures of compounds contained in the ether composition and quantitatively analyzing their contents, or a method of obtaining it directly from the composition.

Specifically, in the case of determining it by means of an NMR method, $^{19}$F-NMR of the ether composition is measured to obtain the peak area of the $CF_3$ group. For example, a chemical shift of $^{19}$F-NMR of —$OCF_3$ is observed in the vicinity of from −54.0 to −56.0 ppm.

In the quantitative analysis of the number of OH group terminals, when the terminals are —$CF_2CH_2OH$ groups, it is obtained from the peak area in the vicinity of from −80 to −81.0 ppm of $^{19}$F-NMR attributable to fluorine atoms of $CF_2$ in the groups. When the terminals are —$CF_2CH_2OCH_2CH(OH)CH_2OH$ groups, it is obtained from the peak area in the vicinity of from −75.0 to −78.0 ppm of $^{19}$F-NMR attributable to fluorine atoms of $CF_2$ in the groups. When the terminals are —$CF_2CH_2(OCH_2CH_2)_gOH$ groups, it is obtained from the peak area in the vicinity of from −78.0 to −80.0 ppm of $^{19}$F-NMR attributable to fluorine atoms of $CF_2$ in the groups.

Further, as another method, it can be obtained from the results of $^{19}$F-NMR and $^1$H-NMR measurements by using a compound having both hydrogen atoms and fluorine atoms as an internal standard substance. As such an internal standard substance, bistrifluoromethylbenzene may, for example, be mentioned.

For example, when the terminals are —$CF_2CH_2OH$ groups, it can be obtained from the peak area in the vicinity of from 4.0 to 4.1 ppm of $^1$H-NMR attributable to $CH_2$ in the groups, and when the terminals are —$CF_2CH_2OCH_2CH(OH)CH_2OH$ groups or —$CF_2CH_2O(CH_2CH_2O)_g$—H groups, it can be obtained from the peak area in the vicinity of from 3.8 to 4.0 ppm attributable to $CH_2$ adjacent to $CF_2$ or from the ratio to the peak area in the vicinity of 3.5 ppm attributable to $CH_2$ of CH(OH) at the terminals. Further, it can be obtained also from the peak area in the vicinity of from 3.7 to 3.9 ppm attributable to CH in the CH(OH) portion.

In a case where $CH_2CH(OH)CH_2$ and $CH_2CH_2O$ are used in combination, the signal of $^1$H-NMR to be used for the quantitative analysis of the number of OH groups will overlap, and therefore, the OH group bonded to such a group may be chemically modified to a group such as $CF_3C(O)O$— or $CH_3C(O)O$, so that the number of OH groups can be obtained from the peak area of the chemical shift of $^{19}$F-NMR or $^1$H-NMR of such a group. Further, at the time of $^1$H-NMR measurement, the peak attributable to the OH group may sometimes undergo a change in the peak position due to the measuring environment (such as the pH) and may overlap particularly in the vicinity of from 3.5 to 3.8 ppm which is important in identification. Therefore, it is advisable to add a very small amount of a deuterium solvent (such as heavy water) to a sample, so that the hydrogen in the OH group is deuterated to shift the position not to overlap with the above mentioned peak group.

The ether composition of the present invention preferably does not contain a compound (A5). The expression "has not contain a compound (A5)" means that a compound (A5) is not contained at all, or if it is contained, the content quantitatively analyzed by high performance liquid chromatography (hereinafter referred to as HPLC) is not higher than 2.0 mass %.

$$Y(-Z)_4 \quad (A5).$$

When the ether composition of the present invention does not contain the compound (A5), bleeding out can be suppressed, and it is possible to increase the fixative of the lubricant to a substrate. The compound (A5) is preferably removed from the ether composition by a purification method which will be described hereinafter.

The total amount of the compounds (A1) to (A4) is preferably at least 95 mass %, more preferably at least 98 mass %, based on the ether composition. The total amount may be 100 mass %.

The number average molecular weight (hereinafter referred to as Mn) of the ether composition is preferably from 500 to 1,000,000, more preferably from 500 to 100,000, particularly preferably from 1,000 to 20,000.

The molecular weight distribution (hereinafter referred to as Mw/Mn) of the ether composition is preferably from 1.01 to 1.5, more preferably from 1.01 to 1.25. When Mn and Mw/Mn are within such ranges, the viscosity is low, the volatile component is little, and uniformity when dissolved in a solvent will be excellent.

Mn is measured by gel permeation chromatography (hereinafter referred to as GPC). Mw/Mn is obtained from Mn and Mw (mass average molecular weight) measured by GPC.

The following methods may be mentioned as methods for producing the ether composition of the present invention.

Method 1: A method wherein the compounds (A1) to (A4) are respectively produced and purified, and then, they are blended to prepare the composition.

Method 2: A method wherein at the time of producing any one compound among the compounds (A1) to (A4), a reaction product containing the compounds (A1) to (A4) other than said one compound, as by-products, is obtained, and such a reaction product is purified to obtain a composition wherein the $CF_3$ ratio is the specific ratio.

Method 3: A method wherein in the Method 2, at least two types of compositions after the purification are blended to obtain a composition.

For example, in the case of the Method 1, the compounds (A1) to (A4) can be produced by changing the starting materials in the method disclosed in WO2005/068534 to starting materials corresponding to the compounds (A1) to (A4). Specifically, a compound having COF at the terminal is obtained by the esterification, liquid phase fluorination and ester decomposition reaction as disclosed in WO2005/068534. Then, (Method 1-1) the compound having COF at the terminal is reacted with an alcohol or water to change the terminal to an ester or carboxylic acid, followed by reduction; or (Method 1-2) the compound having COF at the terminal is ester-exchanged with an alcohol to change the terminal to an ester, followed by reduction, or is reacted with water to change the terminal to an ester or carboxylic acid, followed by reduction. Among them, it is preferred to employ the method by ester exchange as disclosed in Method 1-2 for the compound of the present invention, from the viewpoint of the production efficiency.

In the case of the Method 2, the reaction may be carried out in the same manner as in the Method 1, or the reaction conditions in the Method 1 may be changed to obtain a reaction product containing by-products. For example, in a case where the compound (A1) is produced by the method via a liquid phase fluorination reaction and the conditions for the liquid phase fluorination reaction are severe, a scission reaction may take place at the terminal of the molecule to form the compounds (A2) to (A5) having $CF_3$ groups at their terminals. In the liquid phase fluorination reaction, the concentration of fluorine gas contained in the gas blown to the liquid phase is preferably from 5.0 to 50 vol %, more preferably from 10 to 30 vol %, with a view to suppressing the formation of the compound (A5). If the fluorine gas concentration becomes high, the proportion of the group (Z) tends to be high, and the proportion of the compound (A1) in the product tends to be low, and the proportions of formation of the compound (A2) to (A4) and the compound (A5) tend to be high.

Depending upon the conditions for the liquid phase fluorination reaction, the compound (A5) may be contained in the product. In a case where the compound (A5) is contained, it is preferred to remove it by purification.

The purification method may, for example, be a method of removing metal impurities, anion impurities, etc. by an ion adsorption polymer, a supercritical extraction method or column chromatography, and a method having them suitably combined is preferred.

In use of the ether composition of the present invention, it may be used as it is, or another compound may be added thereto. Otherwise, it may be used as an additive to another compound.

The ether composition of the present invention may be used as it is, or the ether composition may be used in combination with another material. For example, in a case where it is used as a lubricant containing the ether composition of the present invention, the ether composition may be used as it is.

Further, to the ether composition, PFPE other than the compounds (A1) to (A4) (hereinafter referred to as another PFPE-XX) may be added for use. The amount of another PFPE-XX to be added to the ether composition of the present invention is preferably at most 10 mass %, more preferably at most 5 mass %, based on the total amount of the ether composition (the ether composition of the present invention and such another PFPE-XX) in order to have the characteristics of the present invention sufficiently provided.

Further, to another PFPE-XX, the ether composition of the present invention may be added and used. The content of another PFPE-XX is preferably at most 50 mass %, more preferably at most 30 mass %, in the total amount of the ether composition. By adding the ether composition of the present invention to another PFPE-XX, it is possible to adjust the viscosity of another PFPE-XX and to improve the fixability.

Preferred as another PFPE-XX to be used in combination with the ether composition of the present invention may, for example, be another PFPE-XX having a terminal hydroxyl group, another PFPE-XX having a terminal ultraviolet absorbing group or the like, and the following examples may be mentioned.

<Examples of Another PFPE-XX Having a Terminal OH Group>

FOMBLIN Z-DiOL, FOMBLIN Z-TetraOL, DEMNUM SA, etc.

<Examples of Another PFPE-XX Having a Terminal Ultraviolet Absorbing Group>

FOMBLIN Z-DIAC, FOMBLIN Z-DEAL, FOMBLIN AM2001, FOMBLIN Z-DISOC, DEMNUM SH, MorescoA20H, etc.

In a case where the ether composition of the present invention and another PFPE-XX are used in combination, it is preferred to adjust the $CF_3$ ratio in the total composition to be from 0.01 to 0.5, more preferably to adjust it to be from 0.01 to 0.25, particularly preferably to adjust it to be from 0.01 to 0.15, especially preferably to adjust it to be from 0.01 to 0.05, in order to obtain the performance of the ether composition of the present invention. Further, another PFPE-XX is preferably one not containing PFPE wherein terminal groups are composed solely of $CF_3$ groups. However, the total molar amount of OH groups in the entire composition includes all terminal OH groups, and the total molar amount of $CF_3$ groups includes all $CF_3$ groups other than $CF_3$ groups bonded to quaternary carbon atoms. These total molar amounts can be obtained by the above mentioned NMR method.

Further, as another PFPE-XX, it is preferred to employ one having a number average molecular weight of from 1,000 to 10,000.

In use of the ether composition of the present invention, it is preferred that the ether composition is used as a solvent composition having it dissolved or dispersed in a solvent.

As the solvent, a perfluoroamine (such as perfluorotripropylamine or perfluorotributylamine), a perfluoroalkane (such as Vertrel XF (manufactured by DuPont)) or a hydrofluoroether (such as AE-3000 (manufactured by Asahi Glass Company, Limited)) is, for example, preferred, and a hydrofluoroether is more preferred from such a viewpoint that the ozone-depletion coefficient is low.

The solvent composition may be any one of a solution, a suspension or an emulsion, and a solution is preferred.

The concentration of the ether composition of the present invention in such a solvent composition is preferably from 0.001 to 50 mass %, more preferably from 0.01 to 20 mass %.

In the solvent composition, a component (hereinafter referred to as another component) other than the solvent and the ether composition of the present invention may be contained.

In a case where the solvent composition is to be used as a lubricant, another component may, for example, be a radical scavenger (e.g. X1p (manufactured by Dow Chemicals)).

In a case where the solvent composition is to be used as a surface modifier, another component may, for example, be a coupling agent (such as a silane type, an epoxy type, a titanium type or an aluminum type). Such a coupling agent improves the adhesion between the substrate and the coating film.

It is advisable that the solvent composition does not contain metal ions, anions, moisture, low molecular polar compounds, etc. since, otherwise, the desired performance may not be accomplished.

Metal ions (such as Na, K, Ca and Al) may be bonded to anions to form a Lewis acid catalyst, which promotes a decomposition reaction of PFPE. Anions (such as F, Cl, $NO_2$, $NO_3$, $PO_4$, $SO_4$ and $C_2O_4$) and moisture may corrode the surface of a substrate. Therefore, their contents are, respectively, preferably as follows. Each of Al and Mg is preferably at most 1,000 ppb, each of Na and K is preferably at most 20,000 ppb, Ca is preferably at most 10,000 ppb, and each of Fe, Ni, Cu and Zn is preferably at most 100 ppb. F is preferably at most 10,000 ppm, and each of formic acid, $C_1$, $NO_3$, $SO_4$ and oxalic acid is preferably at most 5,000 ppb. The water content of the solvent composition is preferably at most 2,000 ppm, particularly preferably at most 1,000 ppm. A low molecular weight polar compound (such as an alcohol or a plasticizer which may elute from a resin) may deteriorate the adhesion between the substrate and the coating film.

In a case where the ether composition of the present invention is used as a lubricant for magnetic disks, a known method for using a lubricant may be applied. For example, the method for coating the surface of a substrate for magnetic disks, may, for example, be a roll coating method, a casting method, a dip coating method (an immersion method), a spin coating method, a water casting method, a die coating method, a Langmuir-Blodgett method or a vacuum vapor deposition method, and a dip coating method, a spin coating method or a vacuum vapor deposition method is preferred.

The substrate may, for example, be one having an undercoating layer, a recording layer and a carbon protective film formed in this order on a NiP-plated substrate (aluminum, glass, etc.).

The thickness of the carbon protective film is preferably at most 5.0 nm, and the average surface roughness (Ra) of the carbon protective film is preferably at most 2.0 nm.

In a magnetic disk coated with a lubricant to form a lubricant layer, it is preferred to carry out adsorption treatment to have the lubricant firmly adsorbed on the surface of the carbon protective film.

Such adsorption treatment may, for example, be thermal treatment, infrared irradiation treatment, ultraviolet irradiation treatment or plasma treatment. Thermal treatment or ultraviolet irradiation treatment is preferred, and thermal treatment is more preferred. Further, the magnetic disk after the adsorption treatment may be cleaned with a fluorine type solvent for the purpose of removing any deposit or removing an excessive lubricant.

The surface of the lubricant coating film after the adsorption treatment has high water repellency, and even if it is held at a high temperature under a high humidity condition, penetration of moisture into the interior of the magnetic disk can be prevented, and a high lubricity can be maintained over a long period of time.

By the ether composition of the present invention, the bonding ratio after the adsorption treatment can be at least 60%. The bonding ratio is more preferably at least 65%, particularly preferably at least 70%.

Further, the contact angle of water (at room temperature) on the surface of a magnetic disk treated with the ether composition of the present invention can be at least 80°. The contact angle is particularly preferably at least 85°.

The thickness of the coating film to be formed by the ether composition of the present invention is preferably at most 5.0 nm, more preferably at most 3.0 nm, particularly preferably at most 2.0 nm, from the viewpoint of the durability and improvement of the recording density.

The ether composition of the present invention is applicable also to the surface other than the magnetic disk substrate. For example, it is useful also as an additive to a surface modifier to be applied on the surface of a polymer substrate to control the refractive index of the polymer substrate, a surface modifier to improve the chemical resistance of a polymer substrate, a wire coating material, an ink repellent (such as an ink repellent for coating, or an ink repellent for a printer (such as an ink jet printer), an adhesive for semiconductor device (such as an adhesive for lead on chip tape), a protective coating for semiconductor (such as a moisture proof coating agent or an ascent inhibitor for soldering) or a thin membrane (such as a pellicle membrane) to be used in optical field, a lubricant for an antireflection film for displays and an antireflection film for resists. A coating film obtained from the ether composition of the present invention is transparent with a low refractive index or excellent in thermal resistance and chemical resistance. Further, the coating film maintains a high lubricity and has a self-restoring property.

Further, the ether composition of the present invention is useful also as a surfactant. For example, it is useful as an additive to lower the surface tension of a coating material, as a leveling agent for a coating material, or a leveling agent for a polishing solution. In a case when it is to be added to a coating material, the amount of the ether composition of the present invention is preferably from 0.01 to 5 mass %, based on the coating material.

EXAMPLES

Now, the present invention will be described in further detail with reference to Examples, but it should be understood that the present invention is by no means thereby restricted. In the followings;

tetramethylsilane is abbreviated as TMS, $CCl_2FCClF_2$ as R-113, dichloropentafluoropropane as R-225,
$CClF_2CClFCF_2OCF_2CClF_2$ as CFE-419,
hexafluoroisopropyl alcohol as HFIP, and
isopropyl alcohol as IPA.

Further, the analyses in the Examples were, respectively, carried out at room temperature (25° C.).

(NMR Analysis)

TMS was used as a standard substance for $^1$H-NMR (300.4 MHz).

$CFCl_3$ was used as a standard substance for $^{19}$F-NMR (282.7 MHz).

As a solvent, R-113 was used unless otherwise specified.

(HPLC Analysis)

The compositional ratio of compounds contained in the composition was measured under the following conditions by using a HPLC apparatus (Prominence, manufactured by Shimadzu Corporation). Specifically, in one analytical cycle, the concentration of HFIP in the mobile phase is gradually increased from 0% to 100%, and compounds contained in the composition are sequentially separated starting from a compound having a less number of OH groups, and their mass ratios were analyzed.

Analytical column: normal phase silica gel (SIL-gel, manufactured by YMC Co., Ltd.)

Mobile phase: R-225 (ASAHIKLIN AK-225G, manufactured by Asahi Glass Company, Limited) and HFIP Mobile phase flow rate: 1.0 mL/min Column temperature: 37° C.

Detector: evaporation light scattering detector (GPC Analysis)

In accordance with the method disclosed in JP-A-2001-208736, Mn and Mw were measured by GPC under the following conditions, and Mw/Mn was obtained.

Mobile phase: mixed solvent (R-225/HFIP=99/1 volume ratio) of R-225 (ASAHIKLIN AK-225SEC Grade 1, manufactured by Asahi Glass Company, Limited) and HFIP Analytical column: two PLgel MIXED-E columns (manufactured by Polymer Laboratories) are connected in series.

Standard samples for measuring molecular weight: four perfluoropolyethers having Mw/Mn of less than 1.1 and a molecular weight of from 2,000 to 10,000, and one perfluoropolyether having Mw/Mn of at least 1.1 and a molecular weight of 1,300.

Mobile phase flow rate: 1.0 mL/min

Column temperature: 37° C.

Detector: evaporation light scattering detector (Contact Angle)

The contact angle on the surface of the lubricant coating film was measured by using a contact angle meter (CA-X, manufactured by Face). On the surface of a lubricant coating film, five droplets of hexadecane or water of about 2 μL were placed, and the contact angles were measured, whereupon an average value of the five values was obtained.

(Friction Coefficient)

The friction coefficient of the surface of the lubricant coating film was measured by using a friction measuring apparatus (Tribogear, manufactured by Heidon). As a contact, a SUS ball having a diameter of 10 mm was used, and the measurement was carried out under a load of 2 g at a rotational speed of 25 rpm.

(Transfer Test)

The surface of the contact after the friction coefficient measuring test was observed by an optical microscope. Four portions of the contact were examined to ascertain the presence or absence of attachment of the lubricant and evaluated by the following standards. ◯: No attachment was observed; Δ: attachment was observed at 1 to 3 portions; x: attachment was observed at 4 portions.

(Metal Ion Analysis)

With respect to 1.0 g of each fraction, the contents of metal ions were measured by an ashing-inductively-coupled plasma mass spectrometry.

(Anion Analysis)

1.0 g of each fraction and 30 g of ultrapure water were introduced into a bottle made of a polytetrafluoroethylene preliminarily cleaned with a dilute sodium hydroxide aqueous solution and stirred for 24 hours to prepare a sample, with respect to which, the content of anions was measured by a water-extraction-ion chromatography.

(Water Content)

The water content of each fraction was measured by a Karl Fisher titration method.

Example 1

A reaction was carried out in the same manner as in the method disclosed in Example 11 in WO2005/068534 except that polyoxyethylene glycerol ether (UNIOX G1200, manufactured by NOF CORPORATION) was changed to diglycerol-initiated polyoxyethylene glycerol ether (SC-E1500, manufactured by Sakamoto Yakuhin Kogyo Co., Ltd.). To diglycerol-initiated polyoxyethylene glycerol ether, FCOCF $(CF_3)OCF_2CF(CF_3)O(CF_2)_3F$ was reacted to obtain a compound (B-1) which was liquid at room temperature. As a result of the NMR analysis, the average value of (h+i+j+k) in the compound (B-1) was 37.0, $R^f$ was —$CF(CF_3)OCF_2CF$ $(CF_3)OCF_2CF_2CF_3$, and Mn was 2,600, and Mw/Mn was 1.15.

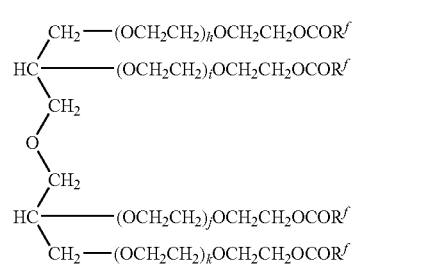

(B-1)

$^1$H-NMR (solvent: $CDCl_3$) δ (ppm): 3.4 to 3.8, 4.5
$^{19}$F-NMR (solvent: $CDCl_3$) δ (ppm): −76.0 to −81.0, −81.0 to −82.0, −82.0 to −82.5, −82.5 to −85.0, −128.0 to −129.2, −131.1, −144.7.

Example 2

A liquid phase fluorination reaction of the compound (B-1) was carried out in the same manner as in the method disclosed in Example 2-1 in WO2005/068534 except that R-113 was changed to CFE-419, and the concentration of fluorine gas contained in the gas blown to the liquid phase was changed from 20 vol % to 10 vol %. The product was a composition (c-2) containing a compound (C-1) as the main component and having at least 99.9 mol % of hydrogen atoms in the compound (B-1) substituted by fluorine atoms. $R^f$ in the formula (C-1) is $-CF(CF_3)OCF_2CF(CF_3)OCF_2CF_2CF_3$.

The NMR spectra measured in the composition (c-2) are as follows.

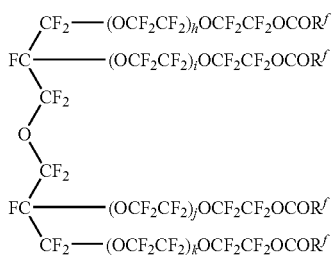

(C-1)

$^1$H-NMR δ (ppm): 5.9 to 6.4

$^{19}$F-NMR δ (ppm): −55.8, −77.5 to −86.0, −88.2 to −92.0, −120.0 to −139.0, −142.0 to −146.0.

Example 3

With respect to the composition (c-2), an ester decomposition reaction was carried out in accordance with the method disclosed in Example 3 in WO2005/068534 to obtain a composition (d-2) containing a compound (D-1) as the main component.

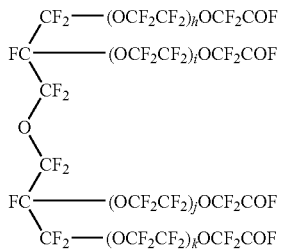

(D-1)

Example 4

Example 4-1

An esterification reaction was carried out by reacting the composition (d-2) with ethanol in accordance with the method disclosed in Example 4-1 in WO2005/068534, to obtain a composition (e-2) containing a compound (E-1) as the main component.

The composition (e-2) was used for the reaction in Example 5.

Example 4-2

An ester exchange reaction was carried out by reacting the composition (d-2) with ethanol in accordance with the method disclosed in Example 4-2 in WO2005/068534 to obtain a composition containing a compound (E-1) as the main component.

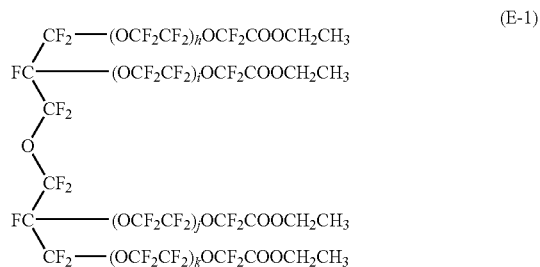

(E-1)

Example 5

A reduction reaction of the composition (e-2) was carried out in accordance with the method disclosed in Example 5 in WO2005/068534 to obtain a composition (a-2) containing a compound (A11-1) as the main component.

From the NMR analysis and HPLC analysis, it was found that the obtained composition (a-2) contained at least one member (hereinafter referred to as compound (A21-1)) selected from a compound (A21-1a) and a compound (A21-1b) each having three OH group terminals and one $CF_3$ group terminal, at least one member (hereinafter referred to as compound (A31-1)) selected from a compound (A31-1a), a compound (A31-1b), a compound (A31-1c) and a compound (A31-1d) each having two OH group terminals and two $CF_3$ group terminals, and at least one member (hereinafter referred to as compound (A41-1)) selected from a compound (A41-1a) and a compound (A41-1b) each having one OH group terminal and three $CF_3$ group terminals.

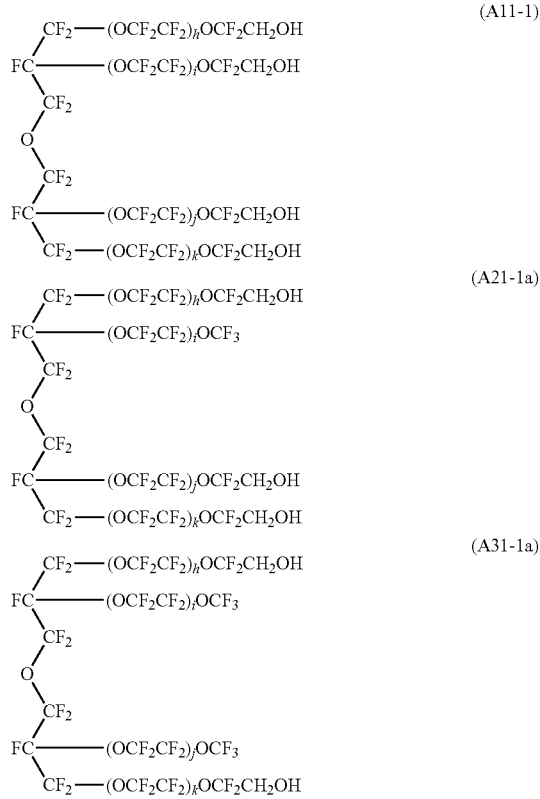

-continued

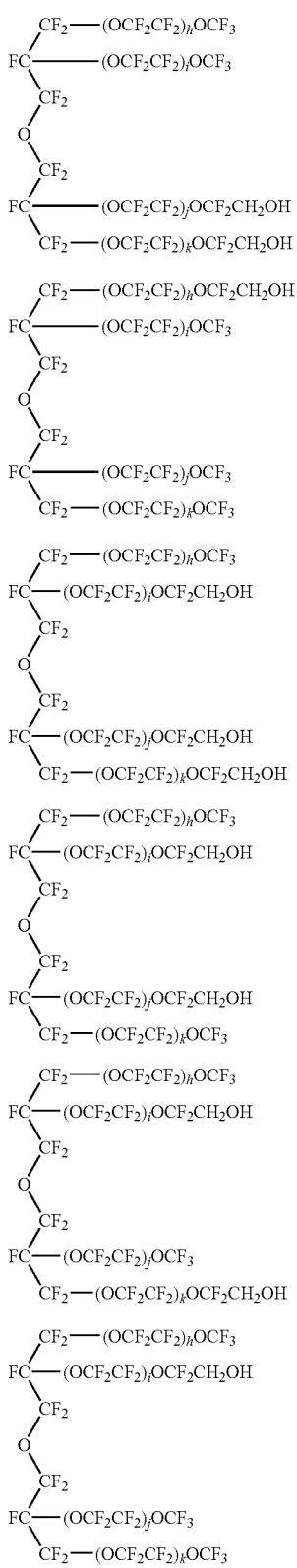

(A31-1c)

(A41-1a)

(A21-1b)

(A31-1b)

(A31-1d)

(A41-1b)

NMR spectrum patterns of composition (a-2):
$^1$H-NMR δ (ppm): 3.94
$^{19}$F-NMR δ (ppm): −54.0, −80.1, −88.2 to −90.5, −135.0 to −139.0

With respect to the composition (a-2), the ratio of molecular terminal $CF_3$ groups to molecular terminal OH groups was obtained by the NMR analysis, whereby the value of $CF_3/(OH+CF_3)=(8/(92+8)=0.08$. The ratio of molecular terminal $CF_3$ groups to molecular terminal OH groups was calculated by obtaining a ratio of the peak area in the vicinity of −54.0 ppm attributable to fluorine atoms in the $CF_3$ groups to the peak area in the vicinity of −80.1 ppm attributable to fluorine atoms in the $CF_2$ groups in $CF_2CH_2OH$ groups. Further, the composition (a-2) had Mn of 2,500 and Mw/Mn of 1.12 as obtained by the GPC analysis. The compositional ratio (mass ratio) obtained by HPLC was such that the compound (A41-1) was 1%, the compound (A31-1) was 3%, the compound (A21-1) was 24%, the compound (A11-1) was 72%, and no compound (A51-1) was contained.

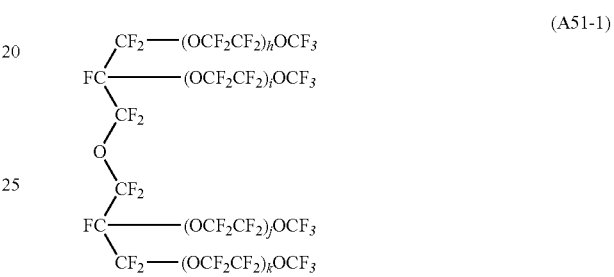

(A51-1)

Example 6

The composition (a-2) was purified by the following column chromatography. One having granular silica gel (MS-Gel D75-120A, manufactured by Si-Tech Co., Ltd.) diluted by R-225, was packed in a column having a diameter of 150 mm and a length of 500 mm to form a silica gel-packed phase having a height of 100 mm.

300 g of the composition (a-2) was introduced to the silica gel-packed phase, and then, using an extraction solvent (a mixed solvent of R-225 and IPA), fractionation operation was carried out while gradually increasing the concentration of IPA in the extraction solvent, whereby fractions (p1-1) to (p1-5) were obtained. The amount of the extraction solvent, the IPA concentration in the extraction solvent and the amounts of the fractions are shown in Table 1. Among them, the fraction (p1-4) was used for further purification.

TABLE 1

| Fraction | IPA concentration [%] | Volume of extraction solvent [L] | Mass [g] |
|---|---|---|---|
| p1-1 | 0 | 5 | 5 |
| p1-2 | 20 | 3 | 55 |
| p1-3 | 50 | 3 | 65 |
| p1-4 | 70 | 3 | 112 |
| p1-5 | 100 | 5 | 35 |
| Total: | | | 272 |
| Loaded amount: | | | 300 |

With respect to each fraction, the HPLC analysis and the GPC analysis were carried out. The results are shown in Table 2.

TABLE 2

| | HPLC analysis compositional ratio [%] | | | | GPC analysis | |
|---|---|---|---|---|---|---|
| | A41-1 | A31-1 | A21-1 | A11-1 | Mn | Mw/Mn |
| a-2 | | 1 | 3 | 24 | 72 | 2500 | 1.12 |
| p1-1 | 3 | 27 | 66 | 4 | 1786 | 1.09 |
| p1-2 | | 5 | 85 | 10 | 1994 | 1.11 |
| p1-3 | | | 73 | 27 | 2786 | 1.14 |
| p1-4 | | | 17 | 83 | 2880 | 1.15 |
| p1-5 | | | | 100 | 5417 | 1.22 |

By the extraction by column chromatography, the proportions of the compound (A31-1) and the compound (A41-1) were large in the fractions having a low polarity, and the proportions of the compound (A11-1) and the compound (A21-1) were large in the fractions of IPA having a high polarity, thus showing an elution pattern influenced by the number of terminal hydroxyl groups.

Example 7

The fraction (p1-4) was purified by the following supercritical extraction method.

An apparatus was prepared which was provided with a stainless steel container (inner diameter of 33 mm×depth of 45 mm) having an inlet and an outlet and having a thick wall thickness, a supercritical carbon dioxide fluid feeding pump (SCF-201, manufactured by JASCO Corporation), an automatic pressure control valve (880-81, manufactured by JASCO Corporation) and a column oven commonly used for column chromatography.

70 g of the fraction (p1-4) was introduced into the container and supercritical carbon dioxide was permitted to flow at a liquified carbon dioxide-calculated flow rate of 5.0 cc/min. The temperature in the container was set to be 60° C., and the pressure in the container was changed with time, so that fractionation was carried out at each pressure stage to obtain fractions (p2-1) to (p2-7). The pressure in the container, the holding time of the pressure and the amount of each fraction are shown in Table 3.

TABLE 3

| Fraction | Pressure [MPa] | Holding time [min] | Mass [g] |
|---|---|---|---|
| p2-1 | 12 | 120 | 5 |
| p2-2 | 13 | 120 | 7 |

TABLE 3-continued

| Fraction | Pressure [MPa] | Holding time [min] | Mass [g] |
|---|---|---|---|
| p2-3 | 14 | 120 | 9 |
| p2-4 | 15 | 120 | 11 |
| p2-5 | 17 | 120 | 12 |
| p2-6 | 18 | 120 | 14 |
| p2-7 | 20→25 | 60→60 | 4 |
| Residue | | | 7 |
| | Extracts + residue: | | 69 |
| | Injected amount: | | 70 |

With respect to each fraction, the HPLC analysis, the NMR analysis and the GPC analysis were carried out. The results are shown in Table 4. The extraction by a supercritical extraction method was influenced by the molecular weight, so that those having smaller molecular weights were extracted first.

TABLE 4

| | NMR analysis Terminal functional group ratio [%] | | HPLC analysis Compositional ratio [%] | | | | GPC analysis | |
|---|---|---|---|---|---|---|---|---|
| | $CF_3OCF_2$— | —$CF_2CH_2OH$ | A41-1 | A31-1 | A21-1 | A11-1 | Mn | Mw/Mn |
| p1-4 | 4 | 96 | | | 17 | 83 | 2880 | 1.15 |
| p2-1 | 14 | 86 | 1 | 1 | 50 | 48 | 2192 | 1.14 |
| p2-2 | 6 | 94 | | | 23 | 77 | 2812 | 1.18 |
| p2-3 | 4 | 96 | | | 15 | 85 | 3264 | 1.28 |
| p2-4 | 2 | 98 | | | 6 | 94 | 3697 | 1.32 |
| p2-5 | 1 | 99 | | | 4 | 96 | 4357 | 1.34 |
| p2-6 | | 100 | | | | 100 | 5685 | 1.38 |
| p2-7 | | 100 | | | | 100 | 9491 | 1.47 |

With respect to each fraction, the solubility in R-225, $CF_3(CFH)_2CF_2CF_3$ (Vertrel XF, manufactured by DuPont) and $CF_2HCF_2OCH_2CF_3$ (AE-3000, manufactured by Asahi Glass Company, Limited) was examined. The fraction and the solvent were mixed so that the concentration of the fraction became 1 mass %, whereby the solubility was visually confirmed. As a result, the respective fractions were all dissolved in the solvents.

Examples 8 to 11

Present Invention

Using carbon as a target, DLC (diamond-like carbon) was vapor-deposited on glass blanks (2.5" blanks, manufactured by Asahi Glass Company, Limited) for magnetic disks by high frequency magnetron sputtering in an Ar atmosphere to form a carbon protective film thereby to prepare a simulated disk. The gas pressure of Ar was 0.003 Torr, and the electric power density during the sputtering was 3 W/cm$^2$ per target area. The thickness of the carbon protective film was 30 nm, and the water contact angle of the surface of the carbon protective film was 40°.

The fractions (p2-1), (p2-3), (p2-4) and (p2-5) obtained in Example 7 were respectively diluted with Vertrel XF to prepare solvent compositions having the concentrations of the fractions being 0.01 mass %.

In each solvent composition, the simulated disk was dipped for 30 seconds and withdrawn at a constant rate of 6 mm/sec. The simulated disk coated with the solvent composition was thermally treated at 100° C. for one hour in a constant temperature furnace to form lubricant coatings. The disk having lubricant coatings formed was immersed in Vertrel XF for 30 seconds for cleaning. Before and after the cleaning, the thickness of the lubricant coatings was measured by an ellipsometer to obtain the bonding ratios. Further, the contact angles and the friction coefficients on the surface of lubricant coatings were measured to evaluate the adhesion. The results are shown in Table 5.

Examples 12 and 13

Reference Examples

A lubricant coating film was formed on the surface of a simulated disk in the same manner as in Example 8 except that the fractions were changed to the fraction (p2-6) obtained in Example 7 and the compound (F) (FOMBLIN Z-TetraOL, manufactured by Solvay, Mn: 3,000, Mw/Mn=1.23), and evaluated in the same manner as in Example 8. The results are shown in Table 5. The $CF_3$ ratio of the compound is 0.

(F), wherein i/ii=1.0.

TABLE 5

| Ex. | | Contact angle [°] | | Coating thickness | Bonding ratio | Friction coefficient | Transfer test |
|---|---|---|---|---|---|---|---|
| | $CF_3$ ratio | Water | Hexadecane | [nm] | [%] | [—] | |
| 8 | p2-1 | 0.14 | 100 | 73 | 1.6 | 63 | 1.3 | Δ |
| 9 | p2-3 | 0.04 | 97 | 71 | 2.0 | 78 | 1.4 | ○ |
| 10 | p2-4 | 0.02 | 90 | 66 | 2.2 | 82 | 1.9 | ○ |
| 11 | p2-5 | 0.01 | 89 | 62 | 2.3 | 82 | 2.1 | ○ |
| 12 | p2-6 | 0 | 84 | 59 | 2.5 | 88 | 2.1 | X |
| 13 | FOMBLIN Z TetraOL | 0 | 93 | 62 | 1.6 | 80 | 3.2 | X |

With respect to the fractions (p2-1), (p2-3), (p2-4) and (p2-5), the metal ion analysis, the anion analysis and the water content measurement were carried out. The results are shown in Table 6.

TABLE 6

| | | p2-1 | p2-3 | p2-4 | p2-5 |
|---|---|---|---|---|---|
| Metal ions [ppb] | Al | 10 | 10 | 10 | 11 |
| | Na | 180 | 190 | 210 | 220 |
| | K | 45 | 43 | 50 | 55 |
| | Mg | 150 | 180 | 200 | 210 |
| | Ca | 310 | 180 | 600 | 300 |
| | Fe | 5 | 6 | 4 | 2 |
| | Ni | 5 | 4 | 6 | 6 |
| | Cu | 3 | n.d. | n.d. | n.d. |
| | Zn | 10 | 8 | 10 | 9 |
| Anions [ppb] | F | 650 | 800 | 750 | 880 |
| | Formic acid | n.d. | n.d. | n.d. | n.d. |
| | Cl | 330 | 240 | 190 | 320 |
| | $NO_3$ | n.d. | n.d. | n.d. | n.d. |
| | $SO_4$ | 930 | 360 | 550 | 580 |
| | Oxalic acid | 900 | 700 | 800 | 700 |
| Water content [ppm] | | 500 | 450 | 460 | 450 | n.d.: not detected

INDUSTRIAL APPLICABILITY

The ether composition of the present invention is useful as a lubricant, etc.

The entire disclosures of Japanese Patent Application No. 2008-013638 filed on Jan. 24, 2008 and Japanese Patent Application No. 2008-196371 filed on Jul. 30, 2008 including specifications, claims and summaries are incorporated herein by reference in their entireties.

What is claimed is:

1. An ether composition comprising at least two ether compounds (A) each of which has from 1 to 4 groups represented by the following formula (X) and from 0 to 3 groups represented by the following formula (Z), with the total of the groups represented by the formula (X) and the groups represented by the formula (Z) being 4:

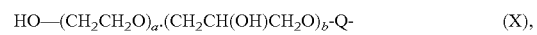
(X),

(Z), provided that in the above formulae (X) and (Z), a is an integer of from 0 to 100, b is 0 or 1, s is an integer of from 0 to 19, g is an integer of from 3 to 200, and Q is a polyfluorinated polymethylene group or a polyfluorinated polymethylene group having an etheric oxygen atom, wherein the ratio ($CF_3$/(OH+$CF_3$)) of the total molar amount of $CF_3$ groups in the groups represented by the formula (Z) to the sum of the total molar amount of $CF_3$ groups in the groups represented by the formula (Z) and the total molar amount of OH groups in the groups represented by the formula (X) is from 0.01 to 0.5.

2. The ether composition according to claim 1, wherein said at least two ether compounds (A) are at least two members selected from the group consisting of a compound represented by the following formula (A1), a compound represented by the following formula (A2), a compound represented by the following formula (A3) and a compound represented by the following formula (A4):

(A1),

(A2),

(A3),

(A4).

wherein X is a group represented by the above formula (X), Y is a perfluoroalkane-tetrayl group or a group having an etheric oxygen atom inserted between carbon-carbon atoms of such a perfluoroalkane-tetrayl group and not having a structure of the group represented by the formula (Z), and Z is a group represented by the above formula (Z).

3. The ether composition according to claim 2, wherein X is a group selected from the group consisting of a group represented by the following formula (X1), a group represented by the following formula (X2), a group represented by the following formula (X3) and a group represented by the following formula (X4):

$$HOCH_2CF_2O(CF_2CF_2O)_d— \quad (X1),$$

$$HOCH_2CH(OH)CH_2OCH_2CF_2O(CF_2CF_2O)_d— \quad (X2),$$

$$HOCH_2CH_2CF_2O(CF_2CF_2O)_d— \quad (X3),$$

$$HOCH_2CH_2OCH_2CF_2O(CF_2CF_2O)_d \quad (X4),$$

wherein d is an integer of from 1 to 200.

4. The ether composition according to claim 2, wherein Y is a group having no $CF_3$ group.

5. The ether composition according to claim 2, wherein Y is a group selected from the group consisting of a group represented by the following formula (Y-1), a group represented by the following formula (Y-2), a group represented by the following formula (Y-3) and a group represented by the following formula (Y-4):

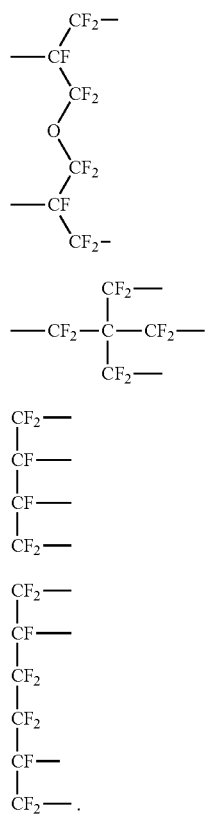

6. The ether composition according to claim 2, wherein the compound represented by the formula (A1) is a compound represented by the following formula (A1-1); the compound represented by the formula (A2) is a compound represented by the following formula (A2-1a), a compound represented by the following formula (A2-1b) or a combination of a compound represented by the following formula (A2-1a) and a compound represented by the following formula (A2-1b); the compound represented by the formula (A3) is a compound selected from the group consisting of a compound represented by the following formula (A3-1a), a compound represented by the following formula (A3-1b), a compound represented by the following formula (A3-1c) and a compound represented by the following formula (A3-1d); and the compound represented by the formula (A4) is a compound represented by the following formula (A4-1a), a compound represented by the following formula (A4-1b) or a combination of a compound represented by the following formula (A4-1a) and a compound represented by the following formula (A4-1b):

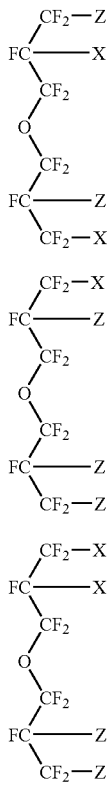

(A3-1d)

(A4-1a)

(A4-1b)

wherein X and Z in the formulae are as defined above.

7. The ether composition according to claim 1, wherein the ether compounds (A) have no —$OCF_2O$— structure.

8. The ether composition according to claim 1, wherein the total amount of the ether compounds (A) is at least 95 mass % based on the ether composition.

9. The ether composition according to claim 1, which has a number average molecular weight of from 500 to 1,000,000 and a molecular weight distribution of from 1.01 to 1.5.

10. A lubricant containing the ether composition as defined in claim 1.

11. The ether composition according to claim 1, wherein the ratio ($CF_3/(OH+CF_3)$) of the total molar amount of $CF_3$ groups in the groups represented by the formula (Z) to the sum of the total molar amount of $CF_3$ groups in the groups represented by the formula (Z) and the total molar amount of OH groups in the groups represented by the formula (X) is from 0.01 to 0.25.

12. The ether composition according to claim 1, wherein the ratio ($CF_3/(OH+CF_3)$) of the total molar amount of $CF_3$ groups in the groups represented by the formula (Z) to the sum of the total molar amount of $CF_3$ groups in the groups represented by the formula (Z) and the total molar amount of OH groups in the groups represented by the formula (X) is from 0.01 to 0.15.

13. The ether composition according to claim 1, wherein the ratio ($CF_3/(OH+CF_3)$) of the total molar amount of $CF_3$ groups in the groups represented by the formula (Z) to the sum of the total molar amount of $CF_3$ groups in the groups represented by the formula (Z) and the total molar amount of OH groups in the groups represented by the formula (X) is from 0.01 to 0.05.

14. The ether composition according to claim 1, wherein the $CF_3$ groups are only present at a terminal of the group represented by the formula (Z).

* * * * *

UNITED STATES PATENT AND TRADEMARK OFFICE
CERTIFICATE OF CORRECTION

PATENT NO. : 8,410,034 B2  
APPLICATION NO. : 12/793212  
DATED : April 2, 2013  
INVENTOR(S) : Daisuke Shirakawa Page 1 of 1

It is certified that error appears in the above-identified patent and that said Letters Patent is hereby corrected as shown below:

On the title page, Item (63), the Related U.S. Application Data has been omitted. Item (63) should read:

--Related U.S. Application Data

(63) Continuation of application No. PCT/JP09/050998, filed on Jan. 22, 2009--

Signed and Sealed this
Eighteenth Day of June, 2013

Teresa Stanek Rea
*Acting Director of the United States Patent and Trademark Office*